(12) United States Patent
Abe

(10) Patent No.: US 7,835,546 B2
(45) Date of Patent: Nov. 16, 2010

(54) PSEUDORANDOM NUMBER GENERATION APPARATUS, PSEUDORANDOM NUMBER GENERATION METHOD AND PROGRAM

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 1084 days.

(21) Appl. No.: 11/379,735

(22) Filed: Apr. 21, 2006

(65) Prior Publication Data
US 2006/0247533 A1 Nov. 2, 2006

(30) Foreign Application Priority Data
Apr. 27, 2005 (JP) .............................. 2005-129751

(51) Int. Cl.
*G06K 9/00* (2006.01)
(52) U.S. Cl. ...................... 382/115; 382/116; 382/117; 382/118; 382/124; 382/125; 382/126; 382/127; 382/128; 382/130; 382/131; 382/132
(58) Field of Classification Search .......... 382/115–134
See application file for complete search history.

(56) References Cited

U.S. PATENT DOCUMENTS

| 5,680,460 | A | 10/1997 | Tomko et al. | |
|---|---|---|---|---|
| 5,933,502 | A * | 8/1999 | Aucsmith et al. | 713/168 |
| 6,301,375 | B1 * | 10/2001 | Choi | 382/115 |
| 7,616,785 | B2 * | 11/2009 | Kondo et al. | 382/117 |
| 2003/0086592 | A1 * | 5/2003 | Takiguchi et al. | 382/115 |

FOREIGN PATENT DOCUMENTS

| JP | 10505474 | 5/1998 |
|---|---|---|
| JP | 2000-165378 | 6/2000 |
| JP | 2001-051831 | 2/2001 |
| WO | WO96/08093 | 3/1996 |
| WO | WO 2005002441 A1 * | 1/2005 |

OTHER PUBLICATIONS

Japanese Office Action issued on Feb. 18, 2010 for corresponding Japanese Patent Application No. JP2005-129751.

* cited by examiner

*Primary Examiner*—Vikkram Bali
*Assistant Examiner*—Daniel Zeilberger
(74) *Attorney, Agent, or Firm*—K&L Gates LLP

(57) ABSTRACT

The present invention allows a device to easily generate pseudorandom numbers using information about a living body. An imaging element outputs an image signal equivalent to imaging light reflecting a target of identification inside a certain part of a living body. The device extracts data from the image signal output from the imaging element. This data reflects a change arising from the living body and a change of the imaging element. The device then generates a pseudorandom number using the data as a seed. Specifically, to produce the seed, the device sequentially selects two image signals output from the imaging element as a pair, sequentially detects difference between the pair of image signals, recognizes one of the detected differences as criterion, and then calculates a degree of difference between the criterion and the rest of differences.

8 Claims, 14 Drawing Sheets

IMa
 IMb

IMc
 IMd

IMe
 IMf

| TARGET FOR CORRELATION COEFFICIENT CALCULATION | | CORRELATION COEFFICIENT |
|---|---|---|
| IMA | IME | 0.9979 |
| IMA | IMF | -0.0641 |
| IMF | IMZ | -0.9994 |

| METHOD | PROCESSING TIME | DIFFICULTY OF HACKING | COMPREHENSIVE EVALUATION |
|---|---|---|---|
| METHOD 1 | ◎ | △ | ○ |
| METHOD 2 | ◎ | ○ | ○ |
| METHOD 3 | △ | ◎ | ○ |
| METHOD 4 | ○ | ◎ | ◎ |

FIG. 15

PSEUDORANDOM NUMBER GENERATION APPARATUS, PSEUDORANDOM NUMBER GENERATION METHOD AND PROGRAM

CROSS REFERENCES TO RELATED APPLICATIONS

The present application claims priority to Japanese Patent Application JP2005-129751 filed in the Japanese Patent Office on Apr. 27, 2005, the entire contents of which is being incorporated herein by reference.

BACKGROUND

The preset invention relates to a pseudorandom number generation apparatus, pseudorandom number generation method and program, and is preferably utilized to generate pseudorandom numbers.

Pseudorandom numbers have been widely used in the cryptography field to enhance security. A pseudorandom number generation apparatus that generates pseudorandom numbers has a simple structure, including a random number generation algorithm called a pseudorandom number generator, and a generation section which generates information called seeds to be input to the pseudorandom number generator. Therefore, this kind of pseudorandom number generation apparatus can be effectively applied to electronics devices with limited capability.

The pseudorandom number generator of the pseudorandom number generation apparatus may be always the same. This will produce the same stream of pseudorandom numbers until the seed is changed. Therefore, to enhance security, it is important to utilize a generation section that produces different seeds every time to generate a new stream of pseudorandom numbers. Generally, the seeds are information representing the time when they are generated.

In the field of biometric authentication, an apparatus, which is for example disclosed in Jpn. Pat. Appln. Laid-open Publication No. H10-505474 generates pseudorandom numbers using information about a living body, i.e. physical characteristics.

When performing registration, this apparatus selects some of Fourier coefficients about fingerprint information and combines them to generate a unique value. The apparatus subsequently generates filter coefficients for a spatial light modulator by using the unique value, and then stores the filter coefficients in a card. At the same time, the apparatus generates pseudorandom numbers by using the unique value as seeds, and then generates a public key from the pseudorandom numbers.

To decode the messages encoded by the public key, a user inserts the card storing the filter coefficients into a card reader, and put his/her finger on an input screen. The spatial light modulator generates optical signals by multiplying the filter coefficients stored in the card and the result of Fourier transform of the user's fingerprint together. If this user's finger is different from the registered finger, these optical signals are different from those of the registered one. This means that the unique value calculated from these optical signals are different from those of the registered one. As a result, even if the apparatus generates pseudorandom numbers by using this unique value as seeds and then produces a private key from the pseudorandom numbers, this private key cannot decode the encoded messages.

SUMMARY

By the way, the above-noted apparatus generates the same unique value from the same person. To do that, the apparatus has to utilize sophisticated methods to generate the same unique value from the same person, because it may be affected by true-random factors such as noise inside the apparatus. However, this diminishes the benefits of the apparatus, because it may require complicated structure.

The present invention has been made in view of the above points and is intended to provide a pseudorandom number generation apparatus, pseudorandom number generation method and program which have a simple structure to generate pseudorandom numbers from information about a living body.

In an embodiment of the present invention, a pseudorandom number generation apparatus including: an imaging element for outputting an image signal equivalent to imaging light reflecting a target of identification, the target being inside a certain part of a living body; extraction means for extracting data from the image signal output from the imaging element, the data reflecting a change arising from the living body and a change of the imaging element; and generation means for generating a pseudorandom number using the data as a seed, the data being extracted by the extraction means.

Therefore, the pseudorandom number generation apparatus can generate different seeds every time because it utilizes true-random factors. Accordingly, the pseudorandom number generation apparatus generates different pseudorandom numbers every time without removing these factors. In addition, since the pseudorandom number generation apparatus utilizes the image signal output from the imaging element (this element outputs the image signal equivalent to imaging light reflecting a target of identification inside a certain part of a living body) to generate the seed, this pseudorandom number generation apparatus can be easily applied to an authentication device that performs a process to extract a characteristic of the target from the image signal for registration and authentication, because there may be no need to modify the process.

In addition, a pseudorandom number generation method including: a first step of extracting data reflecting a change arising from a living body and a change of an imaging element from an image signal output from the imaging element, the image signal being equivalent to imaging light reflecting a target of identification inside a certain part of the living body; and a second step of generating a pseudorandom number using the extracted data as a seed.

Therefore, the pseudorandom number generation method can generate different seeds every time because it utilizes true-random factors. Accordingly, the pseudorandom number generation method generates different pseudorandom numbers every time without removing these factors. In addition, since the pseudorandom number generation method utilizes the image signal output from the imaging element (this element outputs the image signal equivalent to imaging light reflecting a target of identification inside a certain part of a living body) to generate the seed, this pseudorandom number generation method can be easily applied to an authentication device that performs a process to extract a characteristic of the target from the image signal for registration and authentication, because there may be no need to modify the process.

Further, a program for causing an image processing section that performs a prescribed image processing process for an image signal output from an imaging element that outputs the image signal equivalent to imaging light reflecting a target of identification inside a certain part of a living body to execute: a first step of extracting data reflecting a change arising from the living body and a change of the imaging element from the image signal; and a second step of generating a pseudorandom number using the extracted data as a seed.

Therefore, the program can generate different seeds every time because it utilizes true-random factors. Accordingly, the program generates different pseudorandom numbers every time without removing these factors. In addition, since the program utilizes the image signal output from the imaging element (this element outputs the image signal equivalent to imaging light reflecting a target of identification inside a certain part of a living body) to generate the seed, this program can be easily applied to an authentication device that performs a process to extract a characteristic of the target from the image signal for registration and authentication, because there may be no need to modify the process.

In this manner, the pseudorandom number generation apparatus, pseudorandom number generation method and program according to an embodiment of the present invention extracts data reflecting a change arising from the living body and a change of the imaging element from the image signal equivalent to imaging light reflecting a target of identification inside a certain part of the living body, and generates pseudorandom numbers using the extracted data as a seed. Therefore, they can generate different seeds every time because of true-random factors. Accordingly, they generate different pseudorandom numbers every time without removing these factors. In addition, since they utilize the image signal output from the imaging element (this element outputs the image signal equivalent to imaging light reflecting a target of identification inside a certain part of a living body) to generate the seed, they can be easily applied to an authentication device that performs a process to extract a characteristic of the target from the image signal for registration and authentication, because there may be no need to modify the process. Thus, the pseudorandom number generation apparatus, pseudorandom number generation method and program have a simple structure to generate pseudorandom numbers.

The nature, principle and utility of the present invention will become more apparent from the following detailed description when read in conjunction with the accompanying drawings in which like parts are designated by like reference numerals or characters.

Additional features and advantages are described herein, and will be apparent from, the following Detailed Description and the figures.

BRIEF DESCRIPTION OF THE FIGURES

FIG. 15 is a schematic diagram showing the evaluation of seed-generation methods.

DETAILED DESCRIPTION

An embodiment of the present invention will be described in detail with reference to the accompanying drawings.

(1) Overall Configuration of Authentication Device

Figure 1:
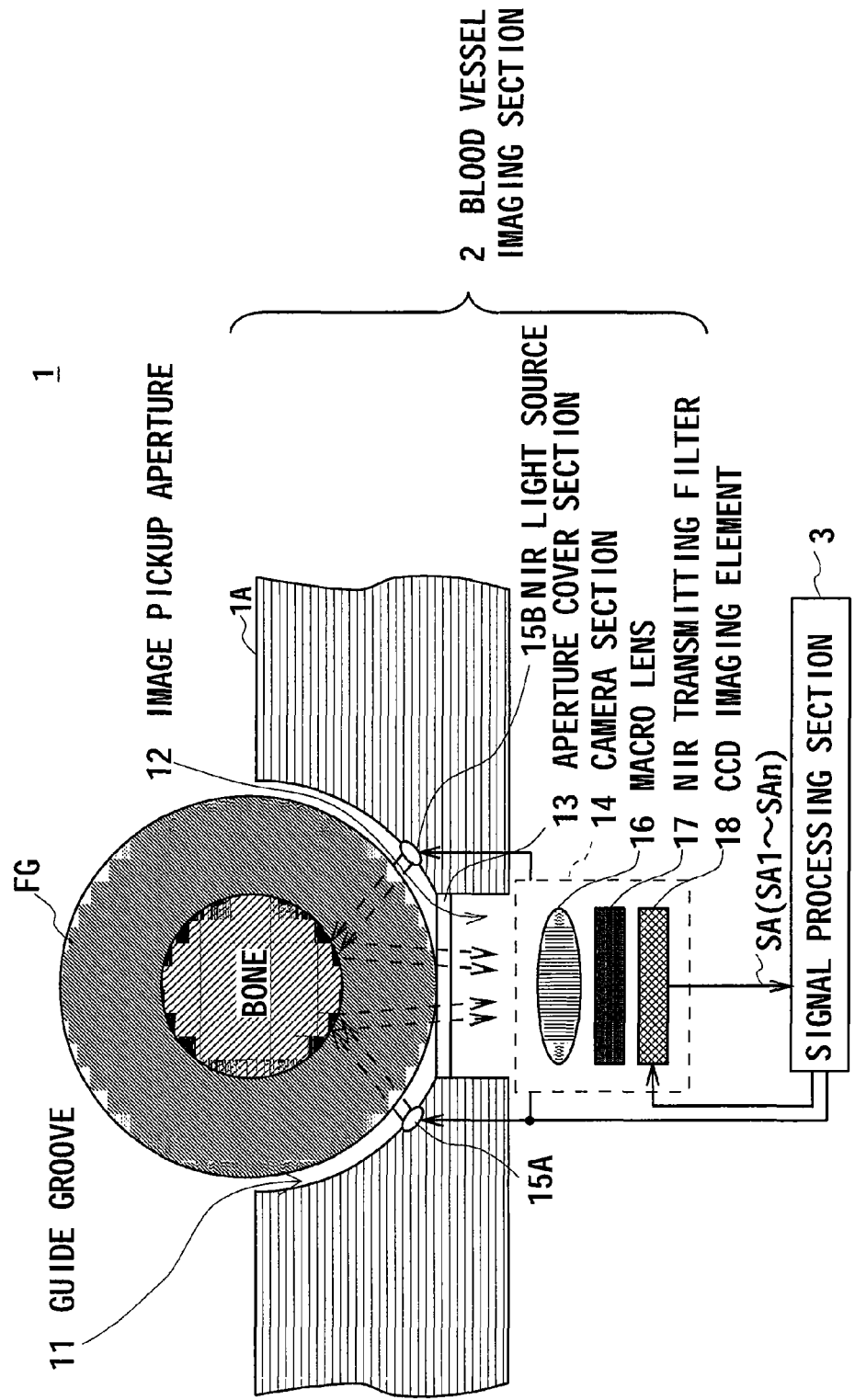
FIG. 1 is a schematic diagram showing the overall configuration of an authentication device according to an embodiment of the present invention.

In FIG. 1, the reference numeral 1 represents an authentication device according to an embodiment of the present invention. The authentication device 1 includes a blood vessel imaging section 2 (i.e. a living body sensor); and a signal processing section 3 which extracts a pattern of formation of blood vessels as living-body information from data picked up by the blood vessel imaging section 2. The blood vessel imaging section 2 and the signal processing section 3 are connected each other via cables.

(1-1) Configuration of Blood Vessel Imaging Section

The blood vessel imaging section 2 has a curved guide groove 11 at a certain position of a housing 1A of the authentication device 1. The guide groove 11 is made to fit the shape of a finger FG. On the bottom of the guide groove 11, an image pickup aperture 12 is formed.

An aperture cover section 13, which is made from transparent and colorless materials, covers the surface of the image pickup aperture 12. Inside the housing 1A, a camera section 14 is located under the image pickup aperture 12.

On the side faces of the guide groove 11, a pair of Near-InfraRed (NIR) light sources 15 (15A and 15B) is disposed at opposite sides of the image pickup aperture 12 such that the NIR light sources 15 are parallel with the shorter direction of the guide grove 11. The NIR light sources 15 emit NIR light as imaging light of blood vessels. The NIR light is especially absorbed in hemoglobin. The NIR light sources 15 emit the NIR light to the side parts of the pad of finger FG placed in the guide groove 11.

That decreases the amount of NIR light reflected off the surface of the finger FG, while it is difficult to decrease when emitting NIR light to the bottom of the pad of the finger FG. The NIR light goes into the finger FG through its surface, and then is absorbed in hemoglobin in blood vessels. At the same time, inside the finger FG, the NIR light is scattered while traveling tissues outside the blood vessels. As a result, the NIR light that reflects the blood vessels comes out from the finger FG, and goes into the camera section 14 via the image pickup aperture 12 and the aperture cover section 13. The NIR light that reflects the blood vessels is also referred to as "blood vessel imaging light."

The camera section 14 has a macro lens 16. The camera section 14 also has a NIR transmitting filter 17 next to the macro lens 16 to transmit a certain wavelength range (approximately 900 nm to 1000 nm) of NIR light. This range of NIR light is dependent on both oxy- and deoxy-hemoglobin. In addition, the camera section 14 has CCD imaging elements 18 next to the NIR transmitting filter 17. After going through the aperture cover section 13, the blood vessel imaging light is led to an imaging plane of the CCD imaging elements 18 via the macro lens 16 and the NIR transmitting filter 17. As a result, the camera section 14 provides an accurate image of both arterial and venous capillaries inside the finger FG placed in the guide groove 11.

Under the control of the signal processing section 3, the CCD imaging elements 18 produce the image of blood vessels (capillaries) through the imaging plane at regular intervals, and then transform it to image signals (also referred to as "blood vessel image signals"). The CCD imaging elements 18 subsequently supply the blood vessel image signals to the signal processing section 3.

(1-2) Configuration of Signal Processing Section

Figure 2:
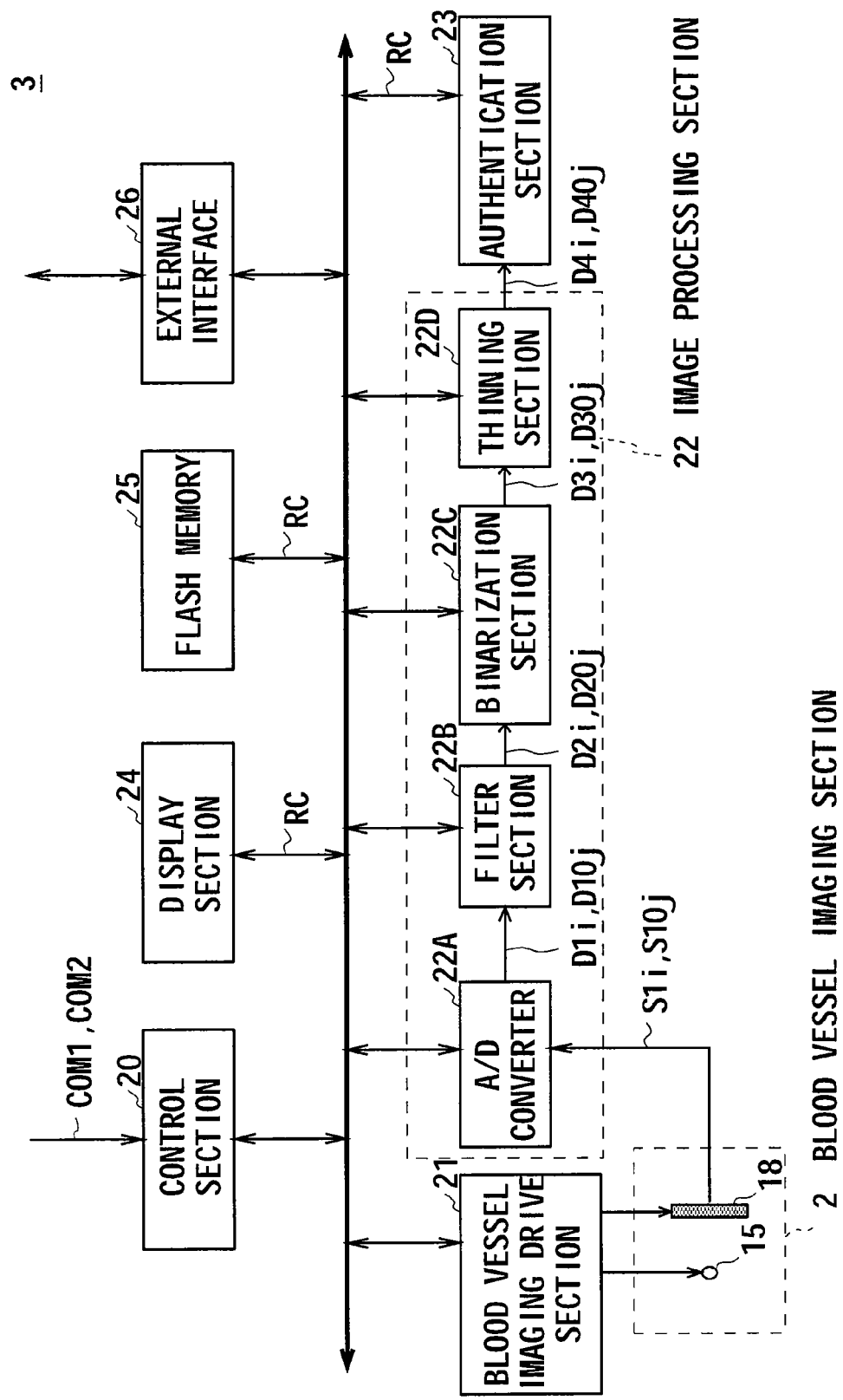
FIG. 2 is a block diagram showing the configuration of a signal processing section.

As shown in FIG. 2, the signal processing section 3 includes a control section 20, a blood vessel imaging drive section 21, an image processing section 22, an authentication section 23, a display section 24, a flash memory 25, and an interface (also referred to as "external interface") 26 that exchanges data with external devices. The control section 20 connects to the blood vessel imaging drive section 21, the image processing section 22, the authentication section 23, the display section 24, the flash memory 25, and the external interface 26.

In this embodiment, a person who wants his/her blood vessels to be registered puts his/her finger FG (FIG. 1) on the guide groove 11, and then operates an operation section (not shown), which is disposed at a certain position on the surface of the housing 1A of the authentication device 1, to start a blood vessel registration mode in which his/her blood vessels are registered.

In response to the operation, the control section 20 receives from the operation section a command COM1 that directs the control section 20 to start the blood vessel registration mode. In response to the command COM1, the control section 20 follows a corresponding program stored in a ROM to start the blood vessel registration mode. In the blood vessel registration mode, the control section 20 controls the blood vessel imaging drive section 21, the image processing section 22 and authentication section 23, and displays controlling information and the like on the display section 24.

In this case, the blood vessel imaging drive section 21 activates the blood vessel imaging section 2, so that the NIR light sources 15 and the CCD imaging elements 18 start operating. As a result, in the blood vessel imaging section 2, the NIR light sources 15 starts to emit NIR light to the side parts of the pad of the finger FG (FIG. 1), which the person puts on the guide groove 11 (FIG. 1). The NIR light travels inside the finger FG (FIG. 1), and then is led to the imaging plane of the CCD imaging elements 18 as the blood vessel imaging light. The blood vessel imaging light is transformed into the blood vessel image signals $S1i$ ($i=1, 2, 3, \ldots$) through the CCD imaging elements 18. The blood vessel image signals $S1i$ are supplied to an Analog-to-Digital (A/D) converter 22A in the image processing section 22.

The A/D converter 22A performs analog-to-digital conversion to the blood vessel image signals $S1i$ to generate a blood vessel image data $D1i$ showing an image of blood vessels. The A/D converter 22A then supplies the blood vessel image data $D1i$ to a filter section 22B.

The filter section 22B performs filtering (such as noise rejection and edge enhancement) on the blood vessel image data $D1i$. The filter section 22B then supplies a resulting blood vessel image data $D2i$ to a binarization section 22C.

The binarization section 22C binarizes the blood vessel image data $D2i$ to generate a data $D3i$ showing black and white blood vessel image. The black and white blood vessel image is also referred to as a "binary blood vessel image." The data $D3i$ showing the binary blood vessel image is also referred to as "binary blood vessel image data." The binarization section 22C then supplies the binary blood vessel image data $D3i$ to a thinning section 22D.

The thinning section 22D performs blood vessel thinning process (such as morphological image process) on the binary blood vessel image data $D3i$. This blood vessel thinning process thins blood vessels on the binary blood vessel image, which is based on the binary blood vessel image data D3, to generate a binary blood vessel image data $D4i$ showing an image of filamentous blood vessels. The filamentous blood vessels on the image are also referred to as "blood-vessel lines." The binary blood vessel image data $D4i$ showing the blood-vessel lines are also referred to as a "binary filamentous blood vessel image data." The thinning section 22D then supplies the binary filamentous blood vessel image data $D4i$ to the authentication section 23.

The authentication section 23 extracts some of the binary filamentous blood vessel image data $D4i$, which is supplied from the image processing section 22, to recognize the person's characteristics (i.e. the pattern of formation of blood vessels). The authentication section 23 then generates information RC showing the person's characteristics, and supplies the information RC to the control section 20. The information RC showing the person's characteristics is also referred to as "registered living-body information."

In this manner, the control section 20 obtains the registered living-body information RC from the authentication section 23 by controlling the blood vessel imaging drive section 21, the image processing section 22 and the authentication section 23. The control section 20 subsequently stores the registered living-body information RC in the flash memory 25 for registration. After that, the control section 20 stops controlling the blood vessel imaging drive section 21, the image processing section 22 and the authentication section 23, and therefore the blood vessel imaging section 2 stops operating.

In this manner, the blood vessel registration mode is done by the control section 20.

In this embodiment, a person who wants to utilize the authentication device 1 to exchange data with a certain service provision server puts his/her finger FG (FIG. 1) on the guide groove 11. The person then operates the operation section (not shown), which is disposed at a certain position on the surface of the housing 1A of the authentication device 1, to start an authentication mode in which the person is authenticated.

In response to the operation, the control section 20 receives from the operation section a command COM2 that directs the control section 20 to start the authentication mode. In response to the command COM2, the control section 20 follows a corresponding program stored in the ROM to start the authentication mode. In the authentication mode, the control section 20 controls the blood vessel imaging drive section 21, the image processing section 22 and authentication section 23. The control section 20 subsequently reads out the registered living-body information RC from the flash memory 25, and then supplies the registered living-body information RC to the authentication section 23. In addition, the control section 20 displays controlling information and the like on the display section 24.

In the same way as in the above-noted blood vessel registration mode, the blood vessel imaging drive section 21 activates the blood vessel imaging section 2. Therefore, in the image processing section 22, the CCD imaging elements 18 output the blood vessel image signals S10$j$ ($j$=1, 2, 3, . . . ) based on the blood vessel imaging light that reflects the blood vessels of the finger FG (FIG. 1), which the person puts on the guide groove 11 (FIG. 1). The image processing section 22 subsequently performs the same processes for the blood vessel image signals S10$j$ as the above-noted blood vessel registration mode. The image processing section 22 then supplies a resulting binary filamentous blood vessel image data D40$j$ to the authentication section 23.

Based on the binary filamentous blood vessel image shown in the binary filamentous blood vessel image data D40$j$, and the binary filamentous blood vessel image shown in the registered living-body information RC (which is read from the flash memory 25 by the control section 20), the authentication section 23 calculates a cross-correlation value.

Based on the cross-correlation value, the authentication section 23 determines whether or not the person whose finger FG is now being shot by the blood vessel imaging section 2 has been registered, and then notifies the control section 20 accordingly.

After receiving the notification from the authentication section 23 by controlling the blood vessel imaging drive section 21, the image processing section 22 and the authentication section 23, the control section 20 stops controlling the blood vessel imaging drive section 21, the image processing section 22 and the authentication section 23, and therefore the blood vessel imaging section 2 stops operating.

When the notification tells that the person has been registered, the control section 20 reads out a program from the ROM to communicate the service provision server. Specifically, the control section 20 exchanges various kinds of data with the service provision server, based on the program and the various kinds of commands input by the registered person's operation through the operation section (not shown). In addition, the control section 20 displays the received data on the display section 24. In this manner, the service provision server provides service to the registered person.

In this manner, the authentication mode is done by the control section 20.

As described above, since blood vessels inside a living body are unique to each person, the authentication device 1 utilizes blood vessels inside a living body as authentication target to authenticate a person. When using this method of biometric authentication, it may be more difficult to steal identities than when using fingerprints. Because fingerprints exist on the surface of a living body, people can steal them.

(2) Biometric Cryptographic Process

In addition to the above-noted configuration, the authentication device 1 performs biometric cryptographic process. In the biometric cryptographic process, the authentication device 1 encrypts data before transmitting this data to the service provision server (this data is also referred to as a "transmission data"). The image processing section 22 produces data associated with a living body (physical characteristics) while performing processes. The authentication device 1 utilizes this data to encrypt the transmission data.

For example, there are three aspects of the biometric cryptographic process. Each aspect will be described in detail.

(2-1) First Biometric Cryptographic Process (2-1-1) Functional Configuration

Figure 3:
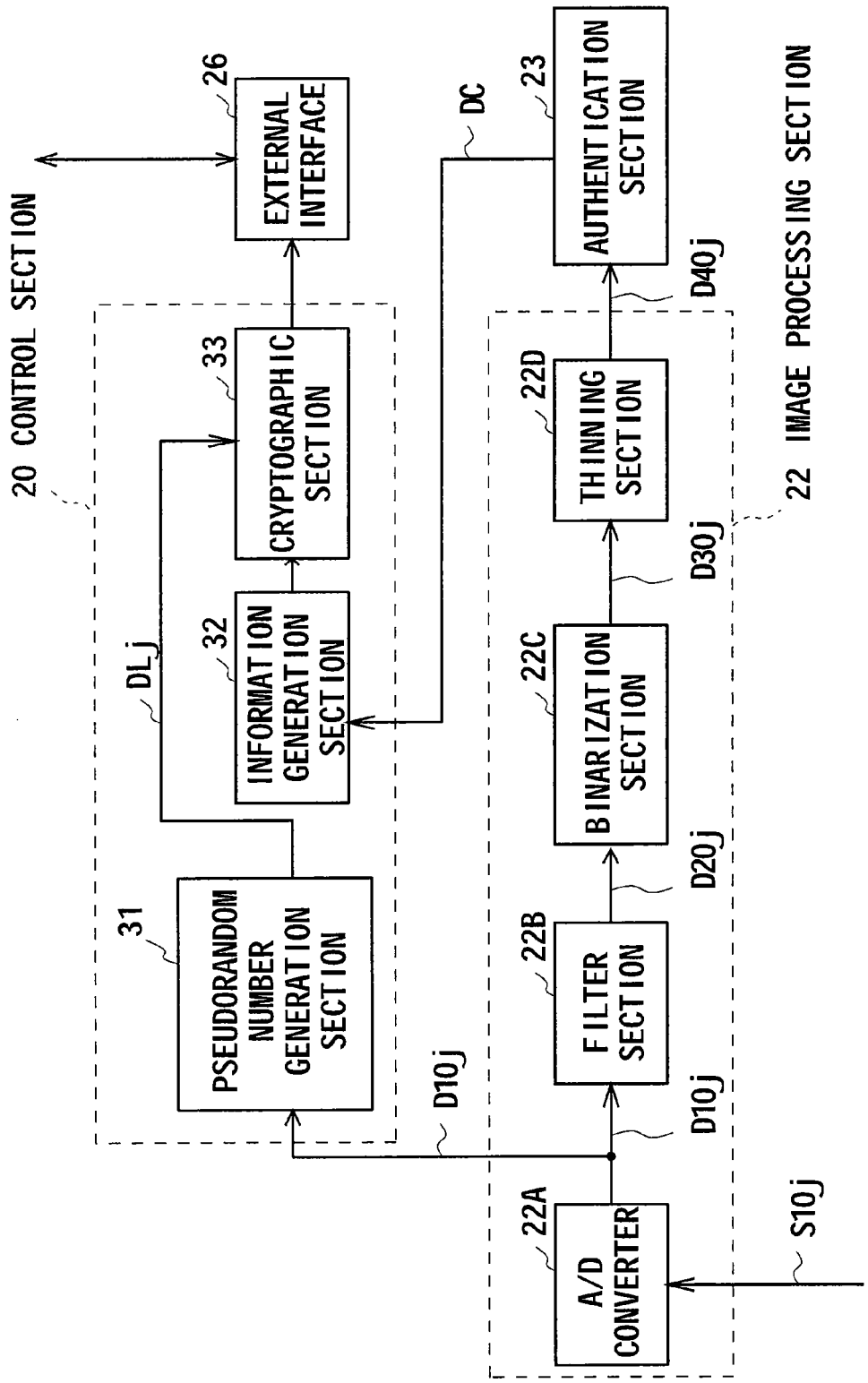
FIG. 3 is a block diagram showing the functional configuration of a control section which performs a first biometric cryptographic process.

A first biometric cryptographic process will be described. This first biometric cryptographic process is performed by the control section 20. In terms of functional configuration, there are a pseudorandom number generation section 31, an information generation section 32 and a cryptographic section 33, as shown in FIG. 3.

The pseudorandom number generation section 31 in the authentication mode receives a blood vessel image data D10$j$, which is output from the A/D converter 22A after the A/D converter 22A performs analog-to-digital conversion for the blood vessel image signals S10$j$ output from the CCD imaging elements 18. The pseudorandom number generation section 31 also reads out the registered living-body information RC from the flash memory 25.

The pseudorandom number generation section 31 calculates Pearson product-moment correlation coefficient that shows the degree of difference (the degree of correlation, in this case) between the blood vessel image shown in the blood vessel image data D10$j$ and the binary filamentous blood vessel image shown in the registered living-body information RC. The pseudorandom number generation section 31 then utilizes a certain algorithm of pseudorandom number generation and the product-moment correlation coefficient as seeds to generate pseudorandom numbers. The pseudorandom number generation section 31 subsequently supplies to the cryptographic section 33 data DLXj showing the pseudorandom numbers (this data DLXj is also referred to as a "pseudorandom number data").

Figure 4A:
FIGS. 4A and 4B are schematic diagrams showing blood vessel images processed by an image processing process and blood vessel images not processed by the image processing process.
Figure 4B:

For example, as shown in FIGS. 4A and 4B, even if the same person puts his/her finger on the authentication device 1, the blood vessel image (FIG. 4A), which is equivalent to the blood vessel image data D10$j$, is not always the same because of disturbance. The disturbance is for example caused by difference between the CCD imaging elements 18 on sensitivity for incident light. In addition, every time NIR light goes into the finger, it is scattering in different ways, and that causes the disturbance. On the other hand, this kind of disturbance has been removed from the binary filamentous blood vessel image (FIG. 4B), because the image processing section 22 (FIG. 1) has performed various processes to remove.

Accordingly, even if both the blood vessel image (FIG. 4A) and the binary filamentous blood vessel image (FIG. 4B) are generated from the same person, the product-moment correlation coefficient is different every time, because of disturbance of the blood vessel image (FIG. 4A). Therefore, the pseudorandom number data DLXj is different every time, because the pseudorandom number data DLXj is generated from the product-moment correlation coefficient (seeds).

While the pseudorandom number generation section 31 is generating the pseudorandom number data DLXj, the information generation section 32 waits to receive the notification from the authentication section 23. The notification, which tells whether a person has been registered or not, is supplied from the authentication section 23 after the image processing section 22 performs various processes.

When the notification received tells that the person has been registered, the information generation section 32 generates the transmission data DX, based on various commands input by the registered person's operation through the operation section (not shown), data received from the service provision server via the external interface 26 (FIG. 3), and the like. The information generation section 32 subsequently supplies the transmission data DX to the cryptographic section 33.

The cryptographic section 33 encrypts the transmission data DX, which is supplied from the information generation section 31, using the pseudorandom number data DLXj supplied from the pseudorandom number generation section 31. The cryptographic section 33 then transmits the encrypted data to the service provision server via the external interface 26 (FIG. 3).

In this manner, the control section 20 utilizes data associated with a living body (i.e. physical characteristics), which is produced by the process of the image processing section 22, to encrypt the transmission data.

(2-1-2) Operation and Effect

In the authentication device 1 with the above configuration, to generate the pseudorandom numbers DLXj, the pseudorandom number generation section 31 utilizes the degree of difference (i.e. Pearson product-moment correlation coefficient) between the blood vessel image data D1 and the binary filamentous blood vessel image data D4 (i.e. the registered living-body information RC) as seeds. The blood vessel image data D1 includes true-random factors such as noise generated from the CCD imaging elements 18. The imaging light inside the finger also can be the true-random factors, because it scatters in different ways depending on the amount of fat inside the finger and the like. On the other hand, the true-random factors have been removed from the binary filamentous blood vessel image data D4.

In this manner, the pseudorandom number generation section 31 utilizes the value reflecting the true-random factors as seeds. That is to say, to generate different pseudorandom numbers DLXj every time, the pseudorandom number generation section 31 makes use of the true-random factors without removing them.

In addition, the pseudorandom number generation section 31 acquires the blood vessel image data D1 from the result of first image processing process in the image processing section 22. The pseudorandom number generation section 31 acquires the binary filamentous blood vessel image data D4 (i.e. the registered living-body information RC) from the result of last image processing process in the image processing section 22.

Accordingly, the pseudorandom number generation section 31 does not have to save the seeds, and therefore does not have a memory for that. In addition, the pseudorandom number generation section 31 can generate the pseudorandom numbers DLXj without changing the configuration of the image processing section 22, which extracts characteristics of blood vessels for registration and authentication.

Thus, the pseudorandom number generation section 31 has a simple structure, and is able to generate different pseudorandom numbers DLXj every time.

(2-1-3) Alternative Embodiments

The above-noted pseudorandom number generation section 31 utilizes the blood vessel image data D1, which is generated by processing the blood vessel image signal S10 output from the CCD imaging elements 18; and the registered living-body information RC (the binary filamentous blood vessel image data D4), which is registered in the flash memory 25. However, the present invention is not limited to this. The pseudorandom number generation section 31 may utilize the blood vessel image signal S10; and the binary blood vessel image data D3, which is generated by the binarization process in the image processing section 22. In this manner, the pseudorandom number generation section 31 can utilize signals output from the living body sensor; and image signals (i.e. the blood vessel image data D1 and D2, the binary blood vessel image data D3, and the binary filamentous blood vessel image data D4), which are generated by the process of the image processing section 22.

In this case, each time a certain event occurs (each time a new authentication mode is started, for example), the pseudorandom number generation section 31 may select a different kind of signal from the signals generated by the process of the image processing section 22, and then calculate the degree of difference between the selected signal and the signal output from the living body sensor. This enhances security for the transmission data DX, because it is more difficult to guess the random-number generation algorithm from the pseudorandom numbers DLXj.

In addition to the degree of difference, for example, the pseudorandom number generation section 31 may detect an index value showing statistical characteristics such as the average of luminance values of pixels on the blood vessel image (this blood vessel image is based on the blood vessel image signal S10 output from the CCD imaging elements 18, or the image signal generated by the process of the image processing section 22 (such as the blood vessel image data D1 and D2, the binary blood vessel image data D3, and the binary filamentous blood vessel image data D4)). The index value also includes the sum of the luminance values, the variance of the luminance values and the like. In this case, each time a certain event occurs, the pseudorandom number generation section 31 may select a different kind of signal from the signals generated by the process of the image processing section 22 to calculate the degree of difference, and also detect a different kind of index value. This further enhances security for the transmission data DX.

(2-2) Second Biometric Cryptographic Process (2-2-1) Functional Configuration

Figure 5:
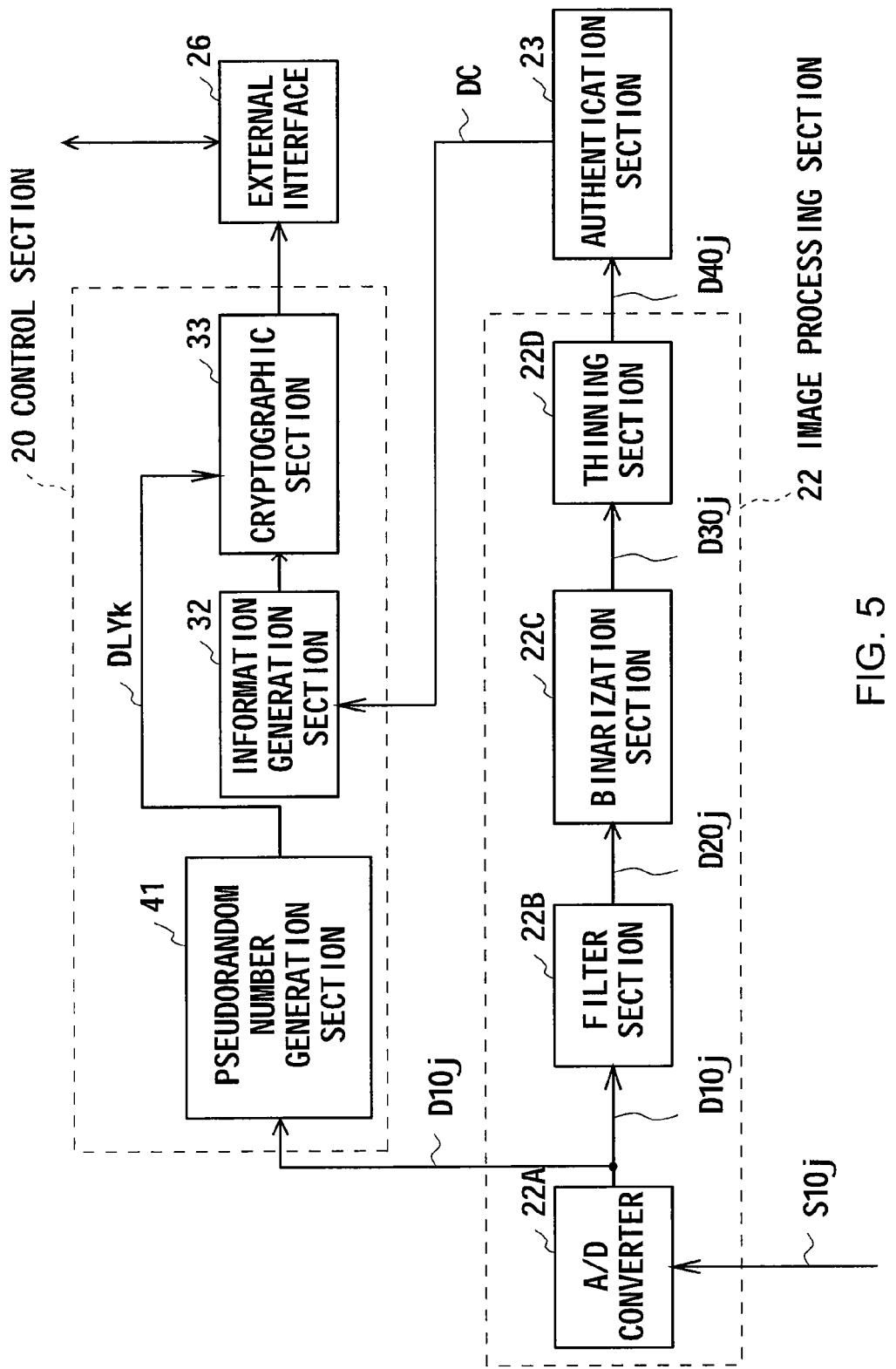
FIG. 5 is a block diagram showing the functional configuration of a control section which performs a second biometric cryptographic process.

A second biometric cryptographic process will be described. This second biometric cryptographic process is performed by the control section 20. In terms of functional configuration, there are a pseudorandom number generation section 41, an information generation section 32 and a cryptographic section 33, as shown in FIG. 5 (the parts of FIG. 5 have been designated by the same reference numerals and marks as the corresponding parts of FIG. 3).

The pseudorandom number generation section 41 utilizes a value showing the degree of change of true-random factor as seeds, while the pseudorandom number generation section 31 utilizes the value reflecting the true-random factor.

The pseudorandom number generation section 41 processes each blood vessel image, which is equivalent to the blood vessel image data D10$j$ output from the CCD imaging elements 18 via the A/D converter 22A, in the following manner; the pseudorandom number generation section 41 generates a difference picture showing the difference between a target blood vessel image and its preceding blood vessel image by subtracting pixel values on the target blood vessel image from corresponding pixel values on the preceding one. The pseudorandom number generation section 41 repeats this process to generate a plurality of difference pictures.

The pseudorandom number generation section 41 sets a first difference picture, which is generated first, as comparison criterion. The pseudorandom number generation section 41 then calculates Pearson product-moment correlation coefficients between the comparison criterion and other difference pictures. The pseudorandom number generation section 41 subsequently generates pseudorandom number data DLYk ($k=1, 2, 3, \ldots$) by using the product-moment correlation coefficients as seeds. The pseudorandom number generation section 41 then supplies the pseudorandom number data DLYk to the cryptographic section 33.

Figure 6A:
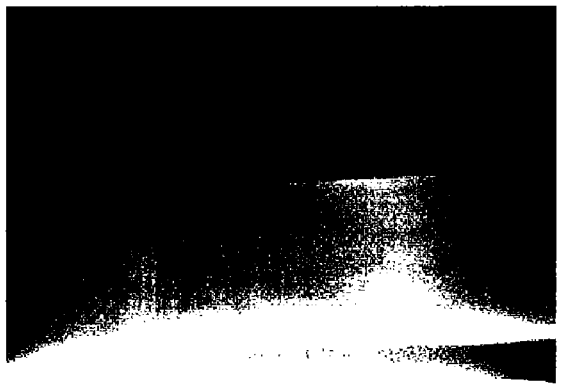
FIGS. 6A to 6C are schematic diagrams illustrating a blood vessel image, its preceding blood vessel image, and a difference image showing disturbance.
Figure 6B:
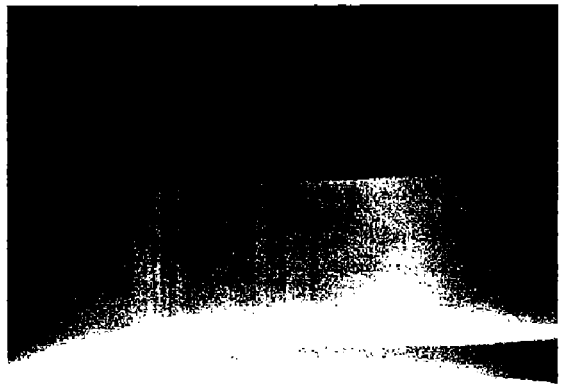
Figure 6C:
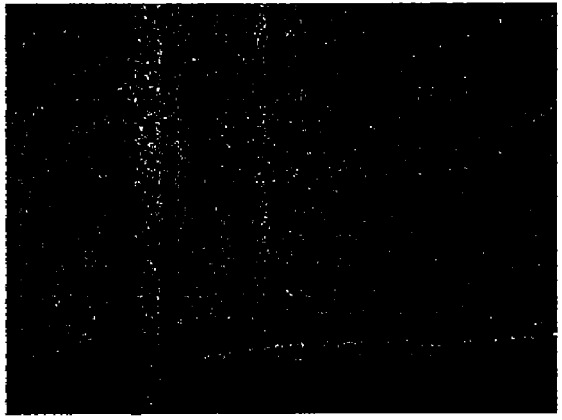

For example, in FIGS. 6A to 6C, a target blood vessel image (FIG. 6A) looks like the same as its preceding blood vessel image (FIG. 6B), because they are generated from the same person. However, there are subtle differences between them, because of disturbance (the disturbance is for example caused by difference between the CCD imaging elements 18 on sensitivity for incident light. In addition, every time NIR light goes into the finger, it is scattering in different ways, and that causes the disturbance). Therefore, a difference image (FIG. 6C) calculated from the two blood vessel images represents the disturbance, i.e. true-random factors.

Accordingly, it is seen that the product-moment correlation coefficient is a value that shows the degree of change of true-random factor, and that the product-moment correlation coefficient is different every time even if the blood vessel images are generated from the same person. Therefore, the pseudorandom number data DLYk are also different every time, because they are generated from the product-moment correlation coefficient (seeds).

Figure 7A:
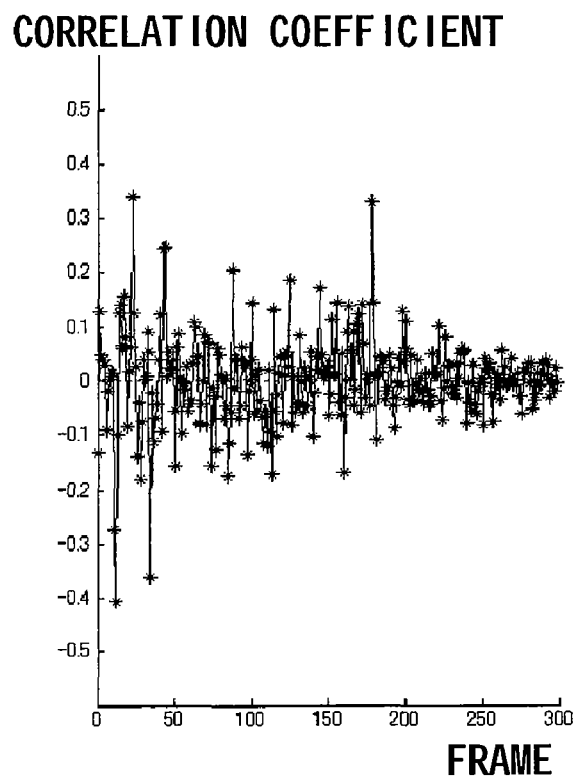
FIGS. 7A and 7B are schematic diagrams showing the result of an experiment (1).
Figure 7B:
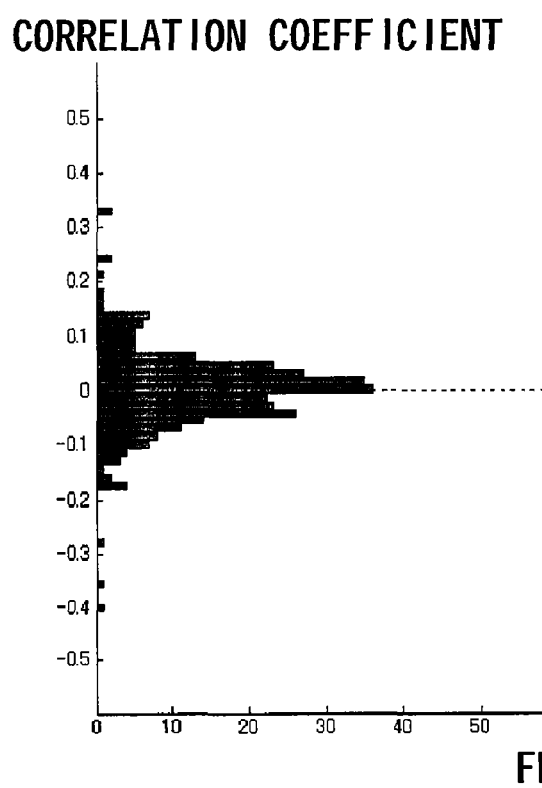

FIGS. 7A and 7B show the result of an experiment. In this experiment, blood vessels have been continuously shot for 20 seconds at 15 frames/sec, generating 300 blood vessel images. The product-moment correlation coefficients were calculated from the blood vessel images by the pseudorandom number generation section 41, and then entered in the correct places on the graph shown in FIGS. 7A and 7B.

Referring to FIGS. 7A and 7B, it is apparent that the product-moment correlation coefficients are spread out properly, and there is not the same value.

(2-2-2) Operation and Effect

In the authentication device 1 with the above configuration, the pseudorandom number generation section 41 acquires the true-random factors from the target blood vessel image and the preceding blood vessel image by subtracting the one's pixel values from the other's pixel values. The pseudorandom number generation section 41 then sets one of the true-random factors as criterion, and calculates the degree of difference between the criterion and other factors as seeds.

Therefore, this method of the pseudorandom number generation section 41 more certainly generates different pseudorandom numbers DLYk than that of the pseudorandom number generation section 31, which utilizes seeds that just reflect the true-random factors.

Thus, the pseudorandom number generation section 41 has a simple structure, and is able to generate different pseudorandom numbers DLYk every time.

(2-2-3) Alternative Embodiments

The above-noted pseudorandom number generation section 41 acquires the true-random factors from the target blood vessel image and the preceding blood vessel image by subtracting the one's pixel values from the other's pixel values. However, the present invention is not limited to this. The pseudorandom number generation section 41 may acquire the true-random factors from the target blood vessel image and further previous blood vessel image by subtracting the one's pixel values from the other's pixel values.

In this case, each time a certain event occurs (each time a new authentication mode is started, for example), the pseudorandom number generation section 41 may choose a different blood vessel image (the preceding or further preceding image) for the calculation with the target blood vessel image. This enhances security for the transmission data DX, because it is more difficult to guess the random-number generation algorithm from the pseudorandom numbers DLYk.

(2-3) Third Biometric Cryptographic Process (2-3-1) Functional Configuration

Figure 8:
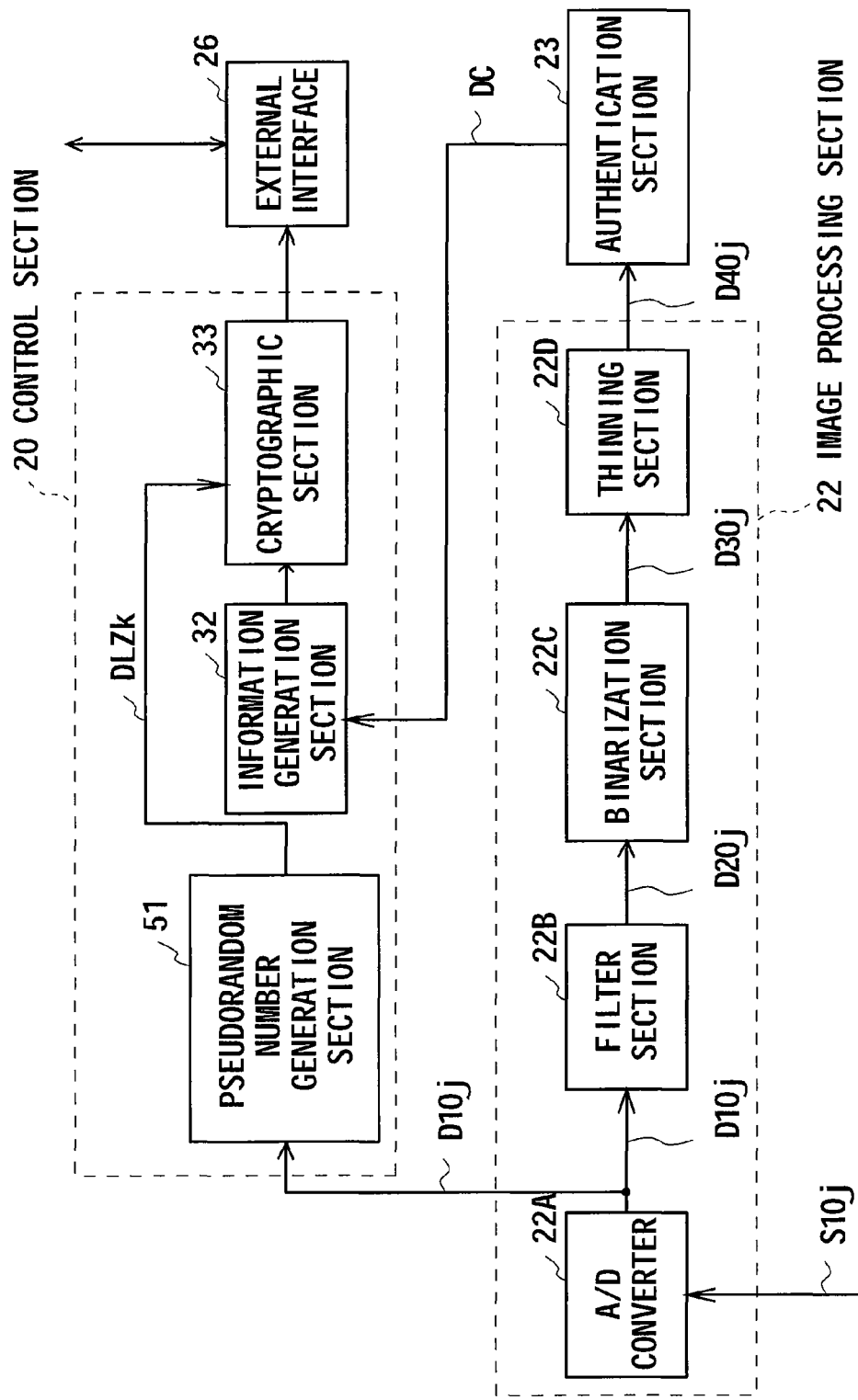
FIG. 8 is a block diagram showing the functional configuration of a control section which performs a third biometric cryptographic process.

A third biometric cryptographic process will be described. This third biometric cryptographic process is for example performed by the control section 20. In terms of functional configuration, there are a pseudorandom number generation section 51, an information generation section 32 and a cryptographic section 33, as shown in FIG. 8 (the parts of FIG. 8 have been designated by the same reference numerals and marks as the corresponding parts of FIG. 5).

The pseudorandom number generation section 51 is different from the pseudorandom number generation section 41, in terms of the way that the value showing the degree of change of true-random factor is generated.

To generate the value showing the degree of change of true-random factor, the pseudorandom number generation section 51 utilizes an independent component analysis. The independent component analysis will be described in brief.

(2-3-2) Independent Component Analysis

In a case in which an independent original signal changes, the independent component analysis is used to guess the original signal from the changed signal.

For example, when the changed signals X1 and X2 are acquired from the original signals S1 and S2 using a linear operator A (2×2 matrix), the changed signals X1 and X2 are defined as follows:

$$\begin{pmatrix} X_1 \\ X_2 \end{pmatrix} = A \begin{pmatrix} S_1 \\ S_2 \end{pmatrix} + \varepsilon = \begin{pmatrix} a_{11} & a_{12} \\ a_{21} & a_{22} \end{pmatrix} \begin{pmatrix} S_1 \\ S_2 \end{pmatrix} + \varepsilon \qquad (1)$$

where $\varepsilon$ represents a true-random factor such as noise.

In this case, the original signals S1 and S2 are guessed from the changed signals X1 and X2 in terms of only the independence of the original signals S1 and S2.

Figure 9A:
FIGS. 9A to 9C are schematic diagrams showing an example of independent component analysis.
Figure 9A:
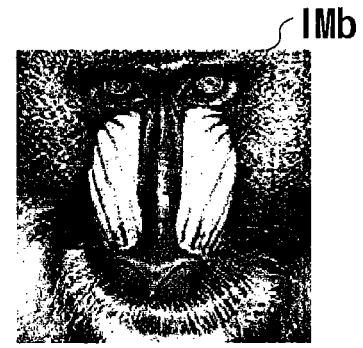
Figure 9B:
Figure 9B:
Figure 9C:
Figure 9C:

For example, as shown in FIGS. 9A to 9C, in a case in which there are changed images IMa and IMb (FIG. 9A) equivalent to the changed signals X1 and X2, combined images IMc and IMd (FIG. 9B) are generated by performing linear combination for the changed images IMa and IMb. And then, restored images IMe and IMf, which are equivalent to images of the original signals S1 and S2, are obtained by performing separation and extraction for the combined images IMc and IMd using the independent component analysis.

Figure 10:
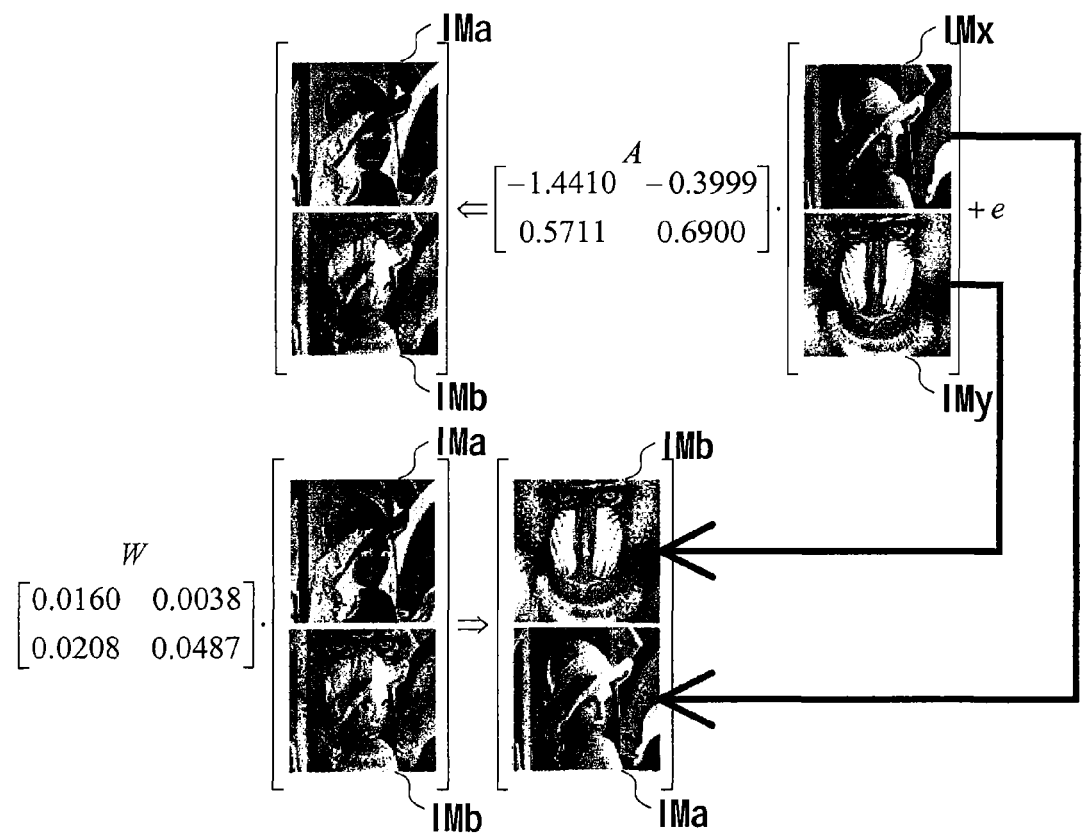
FIG. 10 is a schematic diagram showing an example of independent component analysis with linear combination.

FIG. 10 shows relationship between the changed images IMa and IMb (FIG. 9A), the restored images IMe and IMf (FIG. 9C), and the above-noted formula (1). The linear operator A has values shown in FIG. 10 to process these images. In FIG. 10, $\varepsilon$ represents a little noise. The noise is added to the original images IMx and IMy (equivalent to the original signals S1 and S2), generating the changed images IMa and IMb (equivalent to the changed signals X1 and X2).

Here, if $\varepsilon$ is equal to 0 (i.e. The changed signals X1 and X2 do not include any noise), and then $$\begin{pmatrix} X_1 \\ X_2 \end{pmatrix} = A \begin{pmatrix} S_1 \\ S_2 \end{pmatrix} \qquad (2)$$

is obtained. When the linear operator A is inverted to yield an inverse matrix $A^{-1}$, the equation (2) can be multiplied by the inverse matrix $A^{-1}$ as follows:

$$A^{-1} \begin{pmatrix} X_1 \\ X_2 \end{pmatrix} = A^{-1} \cdot A \begin{pmatrix} S_1 \\ S_2 \end{pmatrix} = E \begin{pmatrix} S_1 \\ S_2 \end{pmatrix} = \begin{pmatrix} S_1 \\ S_2 \end{pmatrix} \qquad (3)$$

where $A^{-1}$ is the inverse matrix. In this manner, the changed images IMa and IMb can be transformed to the restored images IMe and IMf which are quite equal to the original images IMx and IMy. In contrast, if $\varepsilon$ is not equal to 0 (i.e. The changed signals X1 and X2 include noise), and then a restoration operator (matrix) is defined as follows:

$$WA = PD \qquad (4)$$

where W represents the restoration operator, P is a permutation matrix to associate the order of the original signals S1 and S2 with that of the changed signals X1 and X2, and D is a diagonal matrix indicating amplitude uncertainty. The permutation matrix is a matrix that has exactly one entry 1 in each row and each column. The restoration operator W is extracted by the independent component analysis.

As shown in FIG. 10, the restored images IMe and IMf are generated from the changed image IMa and IMb and the restoration operator W, which was extracted by the independent component analysis.

(2-3-3) Concrete Description of Pseudorandom Number Generation Method

The pseudorandom number generation section 51 generates pseudorandom numbers using the independent component analysis. This method will be described in detail.

Figures 11A, 11B, 11C, 12:
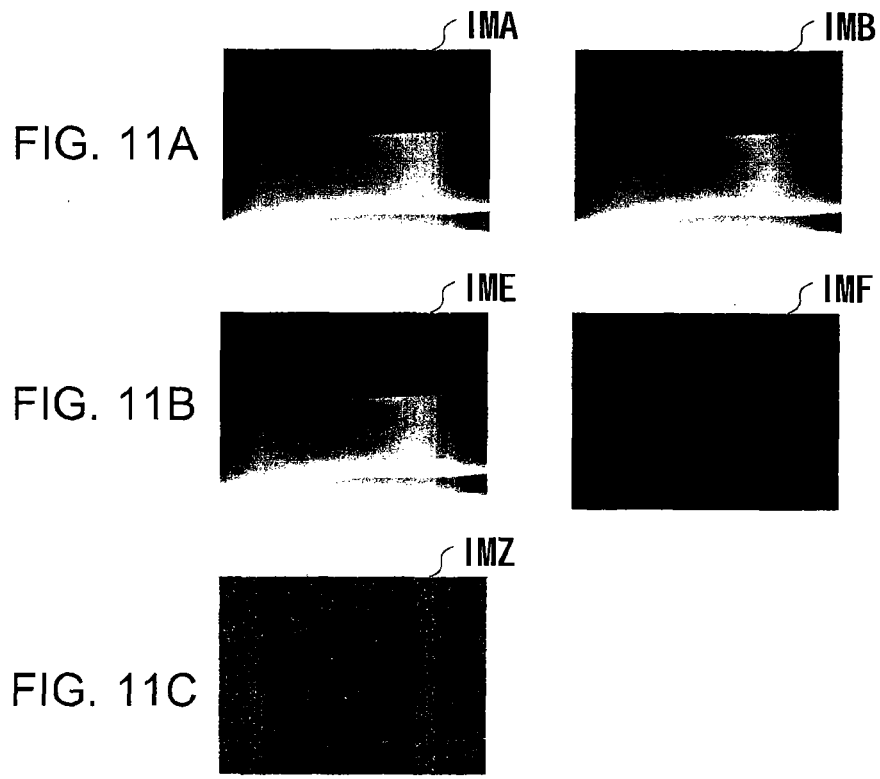
FIGS. 11A to 11C are schematic diagrams showing restored blood vessel images generated from blood vessel images by independent component analysis.
FIG. 12 is a schematic diagram showing an example about correlation coefficients between the blood vessel images and the restored blood vessel images.

As shown in FIGS. 11A to 11C, the CCD imaging elements 18 output for example a first blood vessel image data D101 and a second blood vessel image data D102. The first blood vessel image data D101 and the second blood vessel image data D102 represent blood vessel images IMA and IMB, respectively. The restoration operator is calculated from the blood vessel image IMA and IMB using the independent component analysis. The pseudorandom number generation section 51 in the authentication mode generates two restored blood vessel images IME and IMF based on the blood vessel images IMA and IMB and the restoration operator.

In FIGS. 11A to 11C, the blood vessel images IMA and IMB are equivalent to the changed images IMa and IMb shown in FIG. 10, and the restored blood vessel images IME and IMF are equivalent to the restored images IMe and IMf shown in FIG. 10. In this case, the blood vessel images IMA and IMB are a pair of images.

Referring to FIGS. 11A to 11C, it is apparent that the restored blood vessel image IME is almost the same as the blood vessel image IMA and IMB, and that another restored blood vessel image IMF is similar to a difference image IMZ, which shows difference between a pair of the blood vessel images IMA and IMB. That is to say, the restored blood vessel image IMF is close to a true-random factor. It is possible to determine which of the restored blood vessel images IME and IMF is close to the difference image IMZ by selecting one of the blood vessel images IMA and IMB and calculating Pearson product-moment correlation coefficients between the restored blood vessel image IME and the selected image, and the restored blood vessel image IMF and the selected image, as shown in FIG. 12.

Accordingly, the pseudorandom number generation section 51 chooses one from a pair of the blood vessel images IMA and IMB, and calculates product-moment correlation coefficients between the restored blood vessel image IME and the chosen image, and the restored blood vessel image IMF and the chosen image (the restored blood vessel images IME and IMF are generated from the blood vessel images IMA and IMB). The pseudorandom number generation section 51 then selects for example the restored blood vessel image IMF whose product-moment correlation coefficients is closer to zero, and sets this restored blood vessel image IMF as comparison criterion.

The pseudorandom number generation section 51 subsequently acquires a third blood vessel image D103 and its preceding blood vessel image as a pair, and then repeats this process to the subsequent blood vessel images D104, ..., to make new pairs. And then, in the same way as the first blood vessel image IMA and the second blood vessel image IMB, the pseudorandom number generation section 51 sequentially restores each pair of blood vessel images to obtain two restored blood vessel images for each pair.

Each time two new restored blood vessel images are obtained, the pseudorandom number generation section 51 calculates product-moment correlation coefficients between the two new restored blood vessel images and the comparison criterion (the comparison criterion is the restored blood vessel image IMF close to a true-random factor). The pseudorandom number generation section 51 then checks which of the product-moment correlation coefficients is close to zero, and chooses the one close to zero. The pseudorandom number generation section 51 subsequently generates the pseudorandom number data DLZk using the chosen product-moment correlation coefficient as seeds, and then supplies the pseudorandom number data DLZk to the cryptographic section 33.

This product-moment correlation coefficient is calculated by comparing images close to true-random factors (i.e. the restored blood vessel images close to true-random factors). Therefore, the product-moment correlation coefficient indicates the degree of change of true-random factors. As a result, the product-moment correlation coefficient is different every time, even if images are generated from the same person. Thus, the pseudorandom number data DLXk, which are generated from the product-moment correlation coefficient (seeds), are different every time.

Figure 13A:
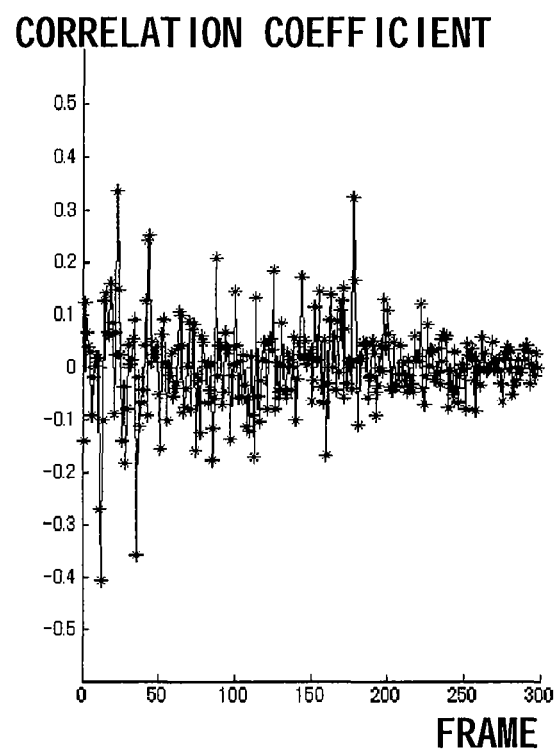
FIGS. 13A and 13B are schematic diagrams showing the result of an experiment (2).
Figure 13B:
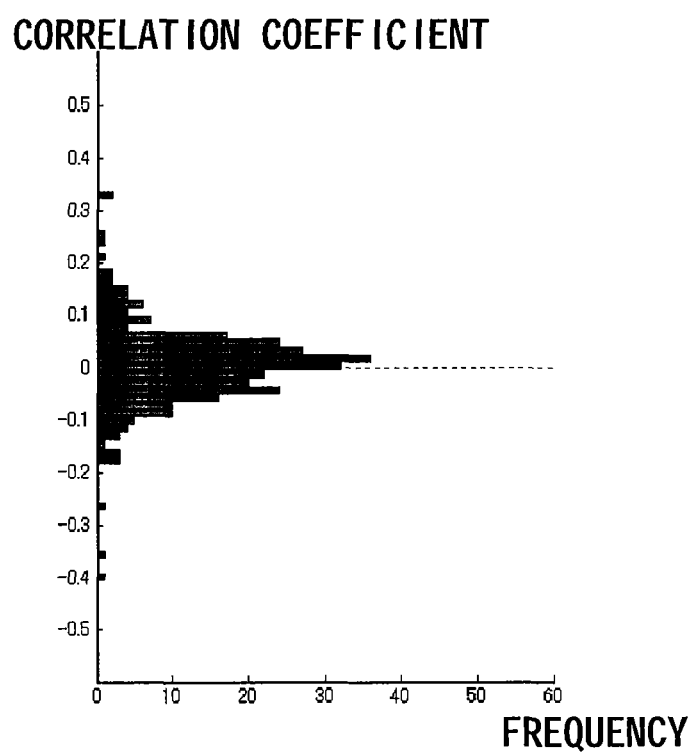
Figure 14A:
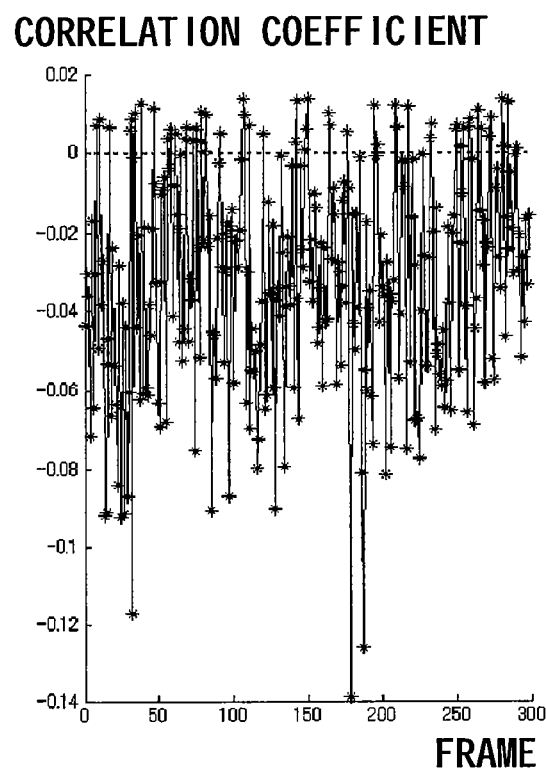
FIGS. 14A and 14B are schematic diagrams showing the result of an experiment (3).
Figure 14B:
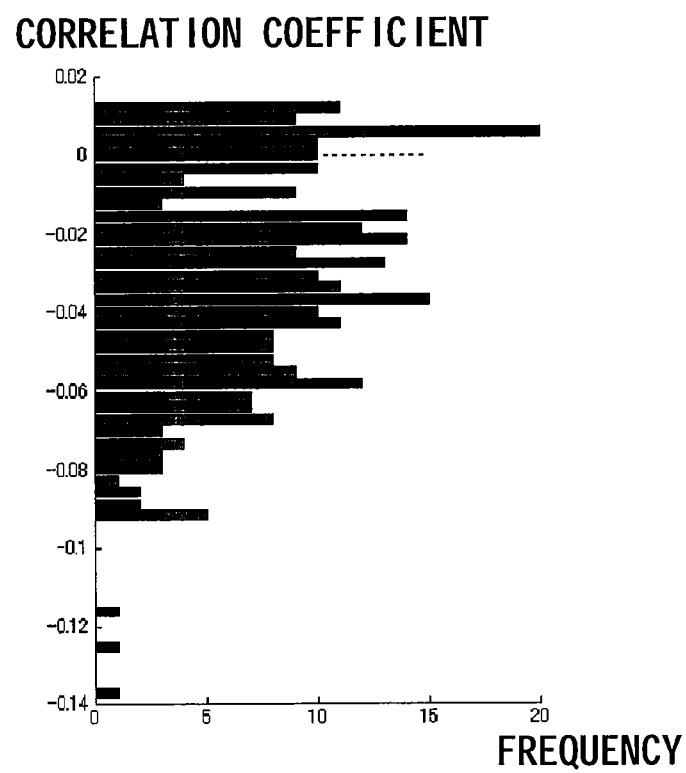

FIGS. 13A and 13B show the result of an experiment. This experiment is similar to the one illustrated by FIGS. 7A and 7B. In this experiment, blood vessels have been continuously shot for 20 seconds at 15 frames/sec, generating 300 blood vessel images. The product-moment correlation coefficients were calculated from the blood vessel images by the pseudorandom number generation section 51, and then entered in the correct places on the graph shown in FIGS. 13A and 13B.

Referring to FIGS. 13A and 13B, it is apparent that the product-moment correlation coefficients are spread out properly, and there is not the same value.

(2-3-4) Operation and Effect

In the authentication device 1 with the above configuration, the pseudorandom number generation section 51 sequentially selects a blood vessel image and its preceding blood vessel image to make pairs of blood vessel images. On the other hand, the pseudorandom number generation section 51 calculates the restoration operator from these blood vessel images using the independent component analysis. And then, the pseudorandom number generation section 51 sequentially calculates values, which are close to true-random factors, based on the pairs of blood vessel images and the restoration operator. The pseudorandom number generation section 51 subsequently selects one of the values as criterion, and then calculates the degree of difference between the criterion and the rest of values as seeds.

By the way, the above-noted pseudorandom number generation section 41 acquires the true-random factors from a blood vessel image and its preceding blood vessel image just by subtracting the one's pixel values from the other's pixel values. In contrast, the pseudorandom number generation section 51 performs more complicated steps to generate values close to true-random factors, using the restoration operator calculated by the independent component analysis. This enhances security for the transmission data DX, because it is more difficult to guess the random-number generation algorithm from the pseudorandom numbers DLZk.

Thus, the pseudorandom number generation section 51 has a simple structure, and is able to enhance security for the transmission data DX.

(2-3-5) Alternative Embodiments

To produce the seeds, the above-noted pseudorandom number generation section 51 sequentially selects a blood vessel image and its preceding blood vessel image to make pairs of blood vessel images, and calculates the restoration operator from these blood vessel images using the independent component analysis. And then, based on the pairs of blood vessel images and the restoration operator, the pseudorandom number generation section 51 calculates values, which are close to true-random factors, as seeds. However, the present invention is not limited to this. The restoration operator also can be the seeds.

In the above case, the restoration operator is used to obtain the restored blood vessel images from two of the blood vessel images. The relationship between the blood vessel images and the restored blood vessel images is defined as follows:

$$\begin{pmatrix} y_1 \\ y_2 \end{pmatrix} = W \begin{pmatrix} I_1 \\ I_2 \end{pmatrix} \quad (5)$$

where $I_1$ and $I_2$ represent the blood vessel images, $y_1$ and $y_2$ represent the restored blood vessel images, and W is defined by $$W = \begin{pmatrix} w_{11} & w_{12} \\ w_{21} & w_{22} \end{pmatrix} \quad (6)$$

where $w_{11}$, $w_{12}$, $w_{21}$ and $w_{22}$ change in response to the blood vessel images that include different true-random factors every time.

Therefore, the pseudorandom number generation section 51 may utilize the factors $w11$, $w12$, $w21$ and $w22$ of the restoration operator W as seeds, each time calculating new restoration operator W from a blood vessel image and its preceding blood vessel image by using the independent component analysis. This reduces the processing load, and makes it more difficult to guess the random-number generation algorithm from the pseudorandom numbers DLZk, compared to the above method in which the pseudorandom number generation section 51 sequentially selects a blood vessel image and its preceding blood vessel image to make pairs of blood vessel images, calculates the restoration operator from these blood vessel images using the independent component analysis, and then calculates values, which are close to true-random factors, as seeds.

In this case, each time a certain event occurs (each time a new authentication mode is started, for example), the pseudorandom number generation section 51 may choose a different blood vessel image (the preceding or further preceding image) for the calculation with the current-target blood vessel image. This enhances security for the transmission data DX, because it is more difficult to guess the random-number generation algorithm from the pseudorandom numbers DLZk.

FIG. 15 shows the evaluation of the above-noted seed-generation methods. In FIG. 15, Method 1 corresponds to the seed-generation method by the pseudorandom number generation section 31, Method 2 corresponds to the seed-generation method by the pseudorandom number generation section 41, Method 3 corresponds to the seed-generation method by the pseudorandom number generation section 51, and Method 4 corresponds to the seed-generation method by the pseudorandom number generation section 51 according to the alternative embodiment. It is seen that Method 4 is the best out of all the Methods 1 through 4, in terms of both the processing time and the difficulty of hacking.

(3) Other Embodiments

In the above-noted embodiments, blood vessels inside a finger are applied as a target of identification. However, the present invention is not limited to this. For example, the target can be other things, including nerves inside a living body; fingerprints on the surface of a living body; voiceprint; and lip print. By the way, a special marker is injected into a body to distinguish nerves in the body. Therefore, nerves can be chosen as the target, and then processed in the same way as the above-noted embodiments.

In the above-noted embodiments, the blood vessel imaging section 2 is applied as a living body sensor. However, the present invention is not limited to this. Other kinds of sensors also can be applied as a living body sensor in line with the target chosen. In addition, in the above-noted embodiments, the image processing section 22 performs A/D conversion process, filtering process, binarization process and thinning process. And this image processing section 22 is applied as image processing means which extracts a characteristic of the target. However, the present invention is not limited to this. Other devices can be applied as the image processing means to extract a characteristic of the chosen target. A living body sensor whose structure is different from the blood vessel imaging section 2 also can be applied, even if blood vessels are chosen as the target. Part of the process of the image processing section 22 can be omitted.

In the above-noted embodiments, firstly, especially in the seed-generation method by the pseudorandom number generation section 31, the pseudorandom number generation section 31 utilizes an image signal, which was produced by the image processing process, as criterion to extract (calculate) the degree of difference between the criterion and one of image signals output from imaging elements. And the pseudorandom number generation section 31 is applied as extraction means which extracts data reflecting a change arising from a living body and a change of imaging elements.

Secondly, in the seed-generation method by the pseudorandom number generation section 41, the pseudorandom number generation section 41 sequentially selects two image signals output from imaging elements as a pair, sequentially detects (calculates) difference between the pair of image signals, recognizes one of the detected differences as criterion, and then extracts (calculates) the degree of difference between the criterion and the rest of differences.

Thirdly, in the seed-generation method by the pseudorandom number generation section 51, the pseudorandom number generation section 51 sequentially selects two image signals output from imaging elements as a pair, sequentially calculates a restoration operator from blood vessel images equivalent to the pair of image signals by using an independent component analysis, sequentially detects a signal component equivalent to difference between the pair of image signals based on the pair of image signals and the restoration operator, recognizes one of the detected signal components as criterion, and extracts (calculates) the degree of difference between the criterion and the rest of the signal components.

Fourthly, in the seed-generation method by the pseudorandom number generation section 51 according to the alternative embodiment, the pseudorandom number generation section 51 sequentially selects two image signals output from imaging elements as a pair, sequentially detects (calculates) a restoration operator from the pair of image signals by using an independent component analysis, and then extracts a factor of the restoration operator.

In this manner, the first to fourth extraction methods are applied in the above-noted embodiments. However, the present invention is not limited to this. The authentication device 1 may change from one extraction method to another depending on the situation. This makes it more difficult for people to guess the random-number algorithm from pseudorandom numbers.

In the above-noted embodiments, the authentication device 1, which performs both the blood vessel registration mode and the authentication mode, is applied. However, the present invention is not limited to this. A device, which only performs the blood vessel registration mode, can be applied. In addition, a device, which only performs the authentication mode, can be applied.

To use these devices, programs may be installed on the devices to perform the processes of the pseudorandom number generation section 31, 41 or 51, the information generation section 32, and the cryptographic section 33. Alternatively, hardware components may be incorporated into the devices to perform these processes.

In the above-noted embodiments, the transmission data DX is encrypted by pseudorandom numbers. However, the present invention is not limited to this. Depending on the usage of the devices, other kinds of secret information such as the registered living-body information RC can be encrypted.

The device according to an embodiment of the present invention can be applied in the field of authentication such as biometric authentication.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A pseudorandom number generation apparatus comprising:
    an imaging element configured to output a plurality of image signals equivalent to imaging light reflecting a target of identification, said target of identification being inside a certain part of a living body, the plurality of image signals including a first image signal, a second image signal, a third image signal, and a fourth image signal;
    an extractor configured to:
        (a) generate a first difference between the first image signal and the second image signal;
        (b) generate a second difference between the third image signal and the fourth image signal; and
        (c) calculate a degree of difference between:
            (i) said generated first difference between the first image signal and the second image signal; and
            (ii) said generated second difference between the third image signal and the fourth image signal, said calculated degree of difference reflecting a change arising from said living body and a change of said imaging element; and
    a generator configured to generate a pseudorandom number using the calculated degree of difference as a seed, said calculated degree of difference being calculated by said extractor, said generated pseudorandom number being supplied to a cryptographic unit configured to encrypt transmission data using said generated pseudorandom number.

2. The pseudorandom number generation apparatus of claim 1, which includes an image processor configured to extract a characteristic of said target, wherein said extractor utilizes one of the plurality of image signals as criterion to extract a degree of difference between said criterion and a target image signal as said data, said target image signal being selected from a plurality of said image signals output from said imaging element.

3. The pseudorandom number generation apparatus of claim 1, wherein said extractor:
    (a) sequentially selects two image signals output from said imaging element as a pair;
    (b) sequentially detects difference between the pair of image signals;
    (c) recognizes one of the detected differences as criterion; and
    (d) thereafter, extracts a degree of difference between the criterion and the rest of differences as said calculated degree of difference.

4. The pseudorandom number generation apparatus of claim 1, wherein said extractor:
    (a) sequentially selects two image signals output from said imaging element as a pair;
    (b) sequentially calculates a restoration operator from blood vessel images equivalent to the pair of image signals by using an independent component analysis;
    (c) sequentially detects a signal component equivalent to difference between the pair of image signals based on the pair of image signals and the restoration operator;
    (d) recognizes one of the detected signal components as criterion; and
    (e) thereafter, extracts a degree of difference between the criterion and the rest of signal components as said calculated degree of difference.

5. The pseudorandom number generation apparatus of claim 1, wherein said extractor:
    (a) sequentially selects two image signals output from said imaging element as a pair;
    (b) sequentially detects a restoration operator from the pair of image signals by using an independent component analysis; and
    (c) thereafter, extracts a factor of the detected restoration operator as said calculated degree of difference.

6. A method of operating a pseudorandom number generation apparatus, the method comprising:
    causing an imaging element to output a plurality of image signals equivalent to imaging light reflecting a target of identification, said target of identification being inside a living body, the plurality of image signals including a first image signal, a second image signal, a third image signal, and a fourth image signal;
    causing an extractor to:
        (a) generate a first difference between the first image signal and the second image signal;
        (b) generate a second difference between the third image signal and the fourth image signal; and
        (c) calculate a degree of difference between:
            (i) said generated first difference between the first image signal and the second image signal; and
            (ii) said generated second difference between the third image signal and the fourth image signal, said calculated degree of difference reflecting a change arising from a living body and a change of said imaging element; and causing a generator to generate a pseudorandom number using the calculated degree of difference as a seed, wherein said generated pseudorandom number is supplied to a cryptographic unit configured to encrypt transmission data using said generated pseudorandom number.

7. A non-transitory computer readable medium storing a program structured to cause an apparatus to:
 (a) cause an image element to output a plurality of image signals equivalent to imaging light reflecting a target of identification inside a certain part of a living body, the plurality of image signals including a first image signal, a second image signal, a third image signal, and a fourth image signal;
 (b) generate a first difference between the first image signal and the second image signal;
 (c) generate a second difference between the third image signal and the fourth image signal;
 (d) calculate a degree of difference between:
  (i) said generated first difference between the first image signal and the second image signal; and
  (ii) said generated second difference between the third image signal and the fourth image signal, said calculated degree of difference reflecting a change arising from said living body and a change of said imaging element; and
 (e) generate a pseudorandom number using the calculated degree of difference as a seed, said generated pseudorandom number being supplied to a cryptographic unit configured to encrypt transmission data using said generated pseudorandom number.

8. A pseudorandom number generation apparatus comprising:
 an imaging element configured to output a plurality of image signals equivalent to imaging light reflecting a target of identification, said target of identification being inside a certain part of a living body, the plurality of image signals including a first image signal, a second image signal, a third image signal, and a fourth image signal;
 an extraction section configured to:
  (a) generate a first difference between the first image signal and the second image signal;
  (b) generate a second difference between the third image signal and the fourth image signal; and
  (c) calculate a degree of difference between:
   (i) said generated first difference between the first image signal and the second image signal; and
   (ii) said generated second difference between the third image signal and the fourth image signal, said calculated degree of difference reflecting a change arising from said living body and a change of said imaging element; and
 a generation section configured to generate a pseudorandom number using the calculated degree of difference as a seed, said calculated degree of difference being extracted by said extraction section, said generated pseudorandom number being supplied to a cryptographic unit configured to encrypt transmission data using said generated pseudorandom number.

* * * * *